US008885613B2

(12) United States Patent
Sachs et al.

(10) Patent No.: US 8,885,613 B2
(45) Date of Patent: Nov. 11, 2014

(54) METHOD OF OPERATING AN ACCESS NETWORK

(75) Inventors: Joachim Sachs, Aachen (DE); Michael Meyer, Aachen (DE); Jacob Kristian Österling, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 621 days.

(21) Appl. No.: 12/937,561

(22) PCT Filed: Dec. 19, 2008

(86) PCT No.: PCT/EP2008/068099
§ 371 (c)(1),
(2), (4) Date: Jan. 5, 2011

(87) PCT Pub. No.: WO2009/127276
PCT Pub. Date: Oct. 22, 2009

(65) Prior Publication Data
US 2011/0096688 A1    Apr. 28, 2011

Related U.S. Application Data

(60) Provisional application No. 61/046,190, filed on Apr. 18, 2008.

(51) Int. Cl.
*H04W 4/00* (2009.01)
*H04W 48/18* (2009.01)
*H04W 52/02* (2009.01)
H04W 76/04 (2009.01)

(52) U.S. Cl.
CPC .......... *H04W 48/18* (2013.01); *H04W 52/0206* (2013.01); *H04W 76/04* (2013.01); *H04W 52/0219* (2013.01); *Y02B 60/50* (2013.01)
USPC ......................... 370/334; 455/437; 455/115.1

(58) Field of Classification Search
None
See application file for complete search history.

(56) References Cited

U.S. PATENT DOCUMENTS 6,360,106 B1    3/2002  Besson
2003/0202655 A1  10/2003  Nattkemper et al.
(Continued)

FOREIGN PATENT DOCUMENTS

CN    1581996 A    2/2005
JP    2000261844 A  9/2000
(Continued)

OTHER PUBLICATIONS

CN Office Action issued Oct. 10, 2012 in re CN Application No. 200880128706.9.

*Primary Examiner* — Christine Duong
(74) *Attorney, Agent, or Firm* — Coats & Bennett, PLLC

(57) ABSTRACT

A method of operating a first access network and a second access network is provided, wherein said access networks serve mobile terminals in an access area and the method comprises: selecting one of said first access network and said second access network on the basis of a power consumption assessment; performing a steering operation for the mobile terminals in said access area, comprising sending steering information to the mobile terminals, the steering information indicating to the mobile terminals to preferably use the non-selected access network not being selected; and setting the selected access network to a power-save mode.

23 Claims, 12 Drawing Sheets

(56) References Cited

U.S. PATENT DOCUMENTS

| | | |
|---|---|---|
| 2007/0058588 A1* | 3/2007 | Fashandi et al. ............... 370/331 |
| 2008/0102832 A1* | 5/2008 | Sengupta et al. ........... 455/435.2 |
| 2009/0034443 A1* | 2/2009 | Walker et al. .................. 370/311 |
| 2009/0168725 A1* | 7/2009 | Mishra .......................... 370/331 |
| 2010/0103829 A1* | 4/2010 | Murzeau et al. .............. 370/252 |

FOREIGN PATENT DOCUMENTS

| | | |
|---|---|---|
| JP | 2002185458 A | 6/2002 |
| JP | 2007104496 A | 4/2007 |
| WO | 02/07464 A1 | 1/2002 |
| WO | 2004/111757 A2 | 12/2004 |
| WO | WO/2007/068691 * | 6/2007 |

* cited by examiner

METHOD OF OPERATING AN ACCESS NETWORK

TECHNICAL FIELD

The invention relates to a method of operating an access network serving mobile terminals in an access area. The invention further relates to a network entity that manages an access network that serves mobile terminals in an access area.

BACKGROUND

Recently, the awareness of the ecological impact of providing telecommunication, operating associated telecommunication networks, and telecommunication in general, has risen amongst vendors of telecommunication equipment as well as network operators. In particular, the environmental aspect and ecological footprint of telecommunication technology has reached a pivotal significance that has already led to increased public funding of research initiatives directed to a sustainable usage of communication technology. Also, an enhanced commitment on sustainable technology can be observed from equipment manufacturers and vendors, who whish to market their products as environmentally friendly.

Since the power consumption of operating a telecommunication network may be substantial and also has become an important contributor to operating cost, operators begin to look for energy efficient network operation and network equipment. Such efforts may not only reduce operation cost drastically, but may also, on the other hand, be used by operators as a marketing instrument, such as employing environmentally friendly, energy efficient, equipment. An evaluation of the so called life-cycle-assessment (LCA), which includes also a measure of carbon dioxide emissions associated with providing network service to an average subscriber, shows that the required transmission power for transmitting data to a subscriber's mobile terminal may be a substantial contributor to the LCA footprint.

A known concept in the field of modern telecommunication system architecture is the so-called multi-access system architecture, where communication to user equipment (UE), such as a mobile terminal, may be conducted by more than one access network. In the following, the terms user equipment and mobile terminal will be used interchangeably. Multi-access capable mobile terminals may, therefore, not only communicate via a single access network, but may also employ a second, third or further access network for communication. Such a communication may, for example in the case of telephony, be forwarded further to a so-called core network which may be operated by a single network operator or service provider and may handle the communication to the mobile terminals. The core network is typically, in turn, further connected to other communication networks, such as PSTNs (Public Switched Telephone Networks), computer networks, such as the Internet, etc.

However, the possibility being given to UE or mobile terminals to use more than one access network for communication may require specific technical features in order to allow for a smooth and efficient network operation. Firstly, the UE should be able to discover the availability of other access networks in an efficient manner. For this reason, the UE can be provided with information about the availability of other access networks. Secondly, a suitable selection of one or more access networks from the available plurality of access networks should be made in order to allow for good communication service performance. Such selection is preferably controlled automatically, since most subscribers are not ready to deal manually with such technically complex issues.

Conventional concepts addressing the above issues include the so-called access network discovery and selection function (ANDSF), which has already been specified by the 3GPP collaboration. The concept thereof is, e.g., described in the technical specification documents 3GPP TS 23.402 VB.3.0 (2008-09), Technical Specification of the 3rd Generation Partnership Project, Technical Specification Group Services and System Aspects, Architecture enhancements for non-3GPP accesses TS-23402, and 3GPP TS 24.302 VI.2.0 (2008-11) Technical Specification of the 3rd Generation Partnership Project; Technical Specification Group Core Network and Terminals; Access to the 3GPP Evolved Packet Core (EPC) via non-3GPP access networks.

SUMMARY

It is an object of the present invention to provide an improved method of operating access networks serving mobile terminals in an access area. It is a further object of the present invention to provide an improved network entity managing access networks which serve mobile terminals in an access area.

According to a first aspect of the present invention, a method of operating a first access network and a second access network is provided, wherein said access networks serve mobile terminals in an access area and the method comprises: selecting one of said first access network and said second access network on the basis of a power consumption assessment; performing a steering operation for the mobile terminals in said access area, comprising sending steering information to the mobile terminals, the steering information indicating to the mobile terminals to preferably use the non-selected access network not being selected; and setting the selected access network to a power-save mode.

According to a second aspect of the present invention, a network entity is provided that manages an access network, wherein the access network serves mobile terminals in an access area and wherein the network entity comprises: a selecting unit being adapted to select said access network on the basis of a power consumption assessment; a steering unit being adapted to generate steering information for the mobile terminals in said access area, the steering information indicating to the mobile terminals to preferably use another access network; a sending unit being adapted to send said steering information to the mobile terminals in the access area; and a setting unit being adapted to set said access network to a power-save mode if selected.

Various embodiments of the present invention may provide particular advantages for an improved method of operating access networks, for an improved network entity managing access networks, and an improved mobile terminal being adapted to be served by more than one access network.

BRIEF DESCRIPTION OF THE DRAWINGS

The above recited features of the present invention will be better understood from the following description taking in conjunction with the accompanying drawings. It is to be noted, however, that the accompanying drawings illustrate only typical embodiments of the present invention, and are, therefore, not to be considered limiting of the scope of the invention.

DETAILED DESCRIPTION

Figure 1A:
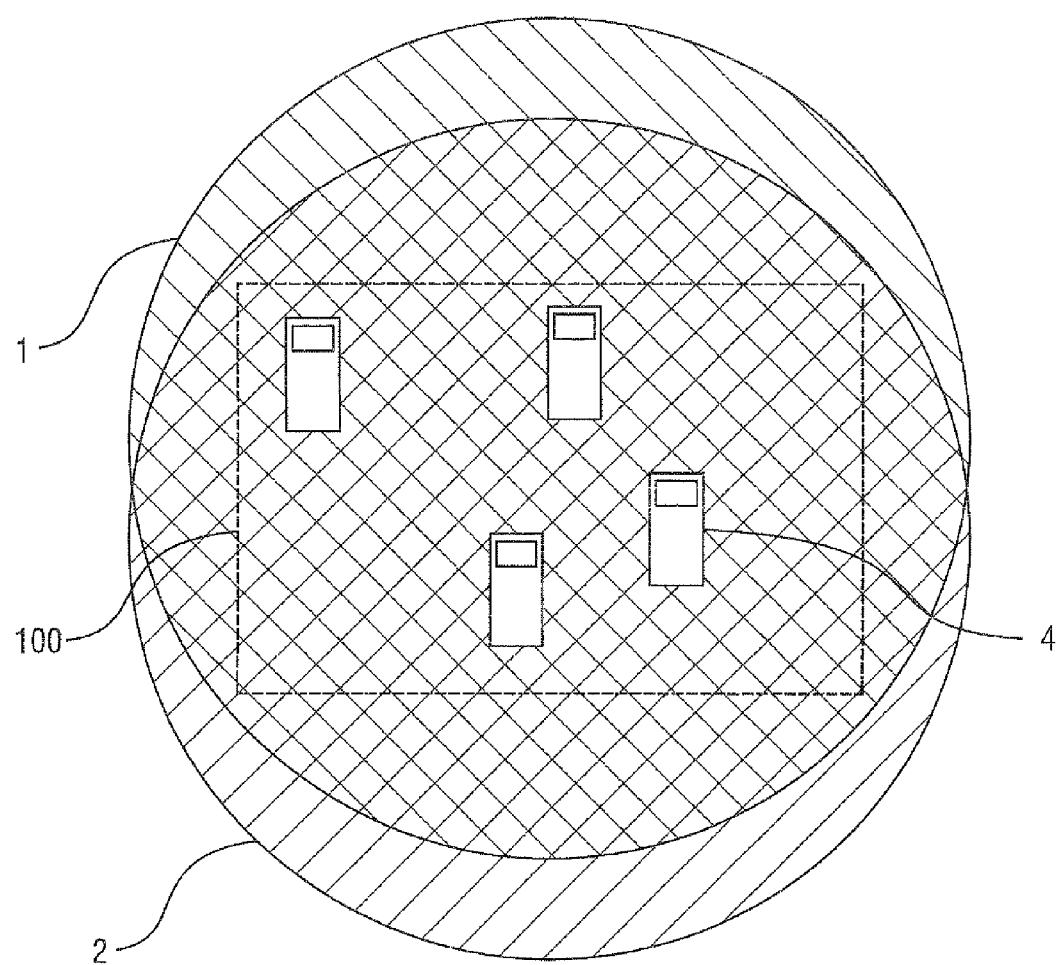
FIG. 1A shows a schematic view of mobile terminals being served by access networks in an access area, according to an embodiment of the present invention.

In the context of the present invention, an access network provides communication with a mobile terminal. Such an access network may be based on one of various access technologies and may provide wireless communication or cable-bound communication. Access technologies may include the global system for mobile communications (GSM), personal communication services (PCS), code division multiple access (CDMA), CDMA-2000, GSM/EDGE radio access network (GERAN), UMTS terrestrial radio access network (UTRAN), E-UTRAN, long term evolution radio access technology (LTE RAT), wireless local area network (WLAN), worldwide interoperability for microwave access (WIMAX), satellite access networks, and also cable bound access networks, such as asynchronous digital subscriber line (ADSL, DSL), integrated services digital network (ISDN), cable television, or analogue telephony networks.

The mobile terminals, which are also referred to as so-called user equipment (UE), may be mobile phones, network access units, personal digital assistants (PDA), notebook or laptop computers, personal computers (PC), wired and/or wireless interface devices, wireless access PCMCIA adapter cards, USE adapters, integrated devices, and the like. The mobile terminals may obtain access service via one or more access networks, being based on one access technology or on different technologies. The access network may directly provide communication between different attached terminals, as e.g. in the case of a WLAN as an access network, or a communication between access network and terminal can be connected further, e.g. towards the Internet or towards a core network of a telephone system. The term user equipment (UE), also denoted as user network or "mobile terminal", is to be understood as relating to any device or group of devices that provides the desired communication functionality, and can thus relate to a single module or unit (like a self-contained mobile telephone) or to a system of modules, such as, for example, a mobile phone and a personal computer comprising e.g. a so-called Bluetooth module, an infrared module, a radio or wireless LAN (WLAN)module, or a cable-bound LAN module, a USB link module or any other kind of module for wired communication.

An access area may be defined in any suitable or desirable way, e.g. as a geographical area in which an appropriately equipped mobile terminal can obtain access service. The access area may thus be a section of a town or a county. A typical example is a cell or group of cells of a cellular communication network, including so-called micro-cells and pico-cells.

The power consumption assessment refers in general to a set of information on which selecting of an access network may be based. The assessment is to provide a basis for deciding whether or not a specific access network may be put into a power save mode, and, whether or not, by means of setting the respective access network to a power save mode, an overall power saving may be attained. A simple example of a power consumption assessment includes a fixed time-of-day for one specific access network, when said access network typically handles no or very little communication traffic. In this case, keeping the access network fully operational would cause a power consumption that does not relate to the benefit of service. As can be seen, the power consumption assessment can be a fixed piece of information or a fixed rule.

However, the power consumption assessment may equally well comprise a continuous or on-going evaluation of parameters relevant for power assessment (e.g. at regularly scheduled intervals), such as capacity of a given access network, traffic demand on a given access network, etc. This evaluation process may especially comprise an on-going solving of an optimization problem with respect to network power consumption using appropriate algorithms, e.g. optimizing cost functions. This may include collecting, analyzing, and considering complex data, such as an actual number of mobile terminals being served by the access network in a specific access area, a change of such a number, a power consumption per mobile terminal served, or related figures of a further access network which is also available in the access area for comparison.

The steering operation may comprise measures for generating steering information. This steering information is transferred to the mobile terminals, such that they may decide whether or not to use a specific access network. Such steering information may comprise an identifier of a specific access network which is to be used preferably. In this way, mobile terminals may be steered away from a selected access network which is about to be set into a power save mode. The mobile terminals may therefore refrain from attempting to establish a communication with an access network and may, instead, directly use another access network. The steering information indicates a preferable use and/or a preferable avoidance of an access network. The selection of the access network is initiated by the mobile terminal based on the steering information, which is in line with the concept of terminal controlled access selection.

The selected access network may, as a consequence, be safely put to the power save mode. Mobile terminals can be informed which access network is still available at full capability. The mobile terminals, in this way, do not lose connectivity and do not have to try to establish a connection to an access network which has been put to a power save mode first just to find out that the respective access network is not available anymore.

Steering information is sent to mobile terminals such that the access selection is controlled by the terminals. Such terminal controlled access selection is characterized in that the terminal itself decides whether or not to select an access network. Steering information provides parameters as basis for the selection, but the selection is initiated by the terminal. A terminal controlled access selection is basically different from a network controlled handover. In a network controlled handover an established connectivity or context between the terminal and an access network is passed on to another defined connectivity or context under control of the network, typically the core network of a communication system, by using corresponding control commands relating to resources associated with the connectivity or context in the access network. In terminal controlled access selection no resources, such as channels or keys, are normally reserved for communication between the access network and the mobile terminal at the time of access selection. In other words, terminal controlled access selection is thus different from a network controlled handover. As an example, mobile terminals complying with a 3GPP (3rd generation partnership project) standard and which are in an idle-mode carry out such a terminal controlled access selection.

According to an embodiment, therefore, steering information can be sent to mobile terminals that are in such an idle mode, or more generally in a mode in which terminal controlled access selection is possible. In other words, such a mode is different from an active or connected mode in which specific resources have been allocated to the connection between terminal and access network. As is known, the idle mode is an operational stand-by or wait state of a terminal in which it stands by, waiting to be set into an active mode, in which a terminating or originating call would be processed. Further an idle mode is characterized in that there is no dedicated connectivity, e.g. between the mobile terminal and a radio access network (RAN). In the idle mode, a mobile terminal and access network typically perform a limited amount of idle mode signaling communication, e.g. listening to signaling channels, sending keep-alive messages and/or location information, etc. The steering information can be sent in any suitable or desirable way as a part of such idle mode signaling, e.g. as part of a network update message from the core network to the terminal. For example, broadcast information to all terminals in an area may be used for this purpose. In this case, mobile terminals need not go into active mode, i.e. set up a call communication via an access network just for receiving the steering information.

It is to be noted that the steering operation preferably comprises also sending the steering information to mobile terminals that are in an active mode. This may be performed in addition to control commands for performing an inter-system handover. In this way, it may be ensured that all mobile terminals in the access area or a maximum number thereof, regardless whether they are in an idle or in an active mode, are addressed and provided with the steering information. Consequently, terminals can be steered away, independently from an established connection, from the selected access network that is to be set in power-save mode, e.g. is to be turned off, and it is ensured that terminals do not return to the selected access network after finishing the active mode, e.g. ending a telephone call.

Thus, terminals can re-adjust appropriately to the upcoming change in access service. For example, they can deregister from the selected access network (e.g. a UMTS access network) and register with another, non-selected access network (e.g. a GSM access network) available in the same access area. Such a process is much more energy efficient than an uncontrolled switching of access service after the selected access network has been placed into the power-save mode. Furthermore, it may be avoided that the mobile terminals try in vain to look for the access network that has been placed into the power-save mode. In this way, an improved perceived quality of Service (QoS) for the user of the mobile terminal may be provided. As stated above, a power save mode may include entirely switching off an access network. However, the power-save mode generally relates to any mode in which power consumption of an access network is reduced. Such a reduction of consumed power may be attained by a reduction of the number of the communication channels used by the respective access network, a reduction of transmission power being employed, a decreasing of a bandwidth of the frequencies being employed, and/or combinations thereof. Setting an access network to a power save mode may further comprise switching off associated base stations and/or corresponding network equipment. In addition to this, communication paths between base stations of the access network and the core network, such as hubs, routers, and switches, may be put into a corresponding power save mode or may be also entirely switched off. However, the power save mode may still allow a remote reactivation of all concerned equipment and communication paths, even if these have been switched off.

FIG. 1A shows a schematic view of mobile terminals 4 located in an access area 100. The mobile terminals are served by a first access network 1 and a second access network 2. As can be seen, services in an access area can for example be provided by two or more access networks in a region of radio coverage overlap. For example, the first access network 1 and the second access network 2 may be associated with respective cells, micro- and/or pico-cells, and the access area 100 is e.g. found in a region in which a cell of access network 1 (e.g. a GSM network) and a cell of access network 2 (e.g. a UMTS network) overlap. The cell configuration may cover the entirety of the access area 100 or only parts thereof. Naturally, a cellular structure is only an example, and an access area can also be defined at an overlap of e.g. two different WLANs (Wireless Local Area Networks), or of a (sub-)cell and a WLAN coverage region. The first access network 1 is based on a first access technology and the second access network 2 is based on a second access technology. These access technologies may be different from each other, e.g. GSM on the one hand and UMTS on the other. Accordingly, the selecting based on the power consumption assessment may consider a broad scope of access technologies, hence, allowing for an optimization which considers a multitude of options However, the first access network 1 and the second access network 2 may also be based on the same access technology (e.g. both relate to GSM), wherein it is possible that the first access network 1 is operated by a first operator and the second access network 2 is operated by a second operator. In general, use of an access network of a respective operator is restricted to the subscribers of that operator. However, several network operators operating access networks based on related or identical access technologies may share the benefits of access network operation according to an embodiment of the present invention. For example, a first operator may agree upon a steering of his own subscribers to the access network of a second operator. In this way, the first operator may put his own access network, and network equipment associated with it, into a power-save mode, and, in this way, may attain substantial saving of power consumption, energy and cost. Rotational schemes may provide an equalized benefit for all contributing operators.

The access area 100 may comprise one or more cells of the first access network 1 and/or the second access network 2. The access area 100 may be further defined independently of cells of said first access network 1 and/or said second access network 2.

Figure 1B:
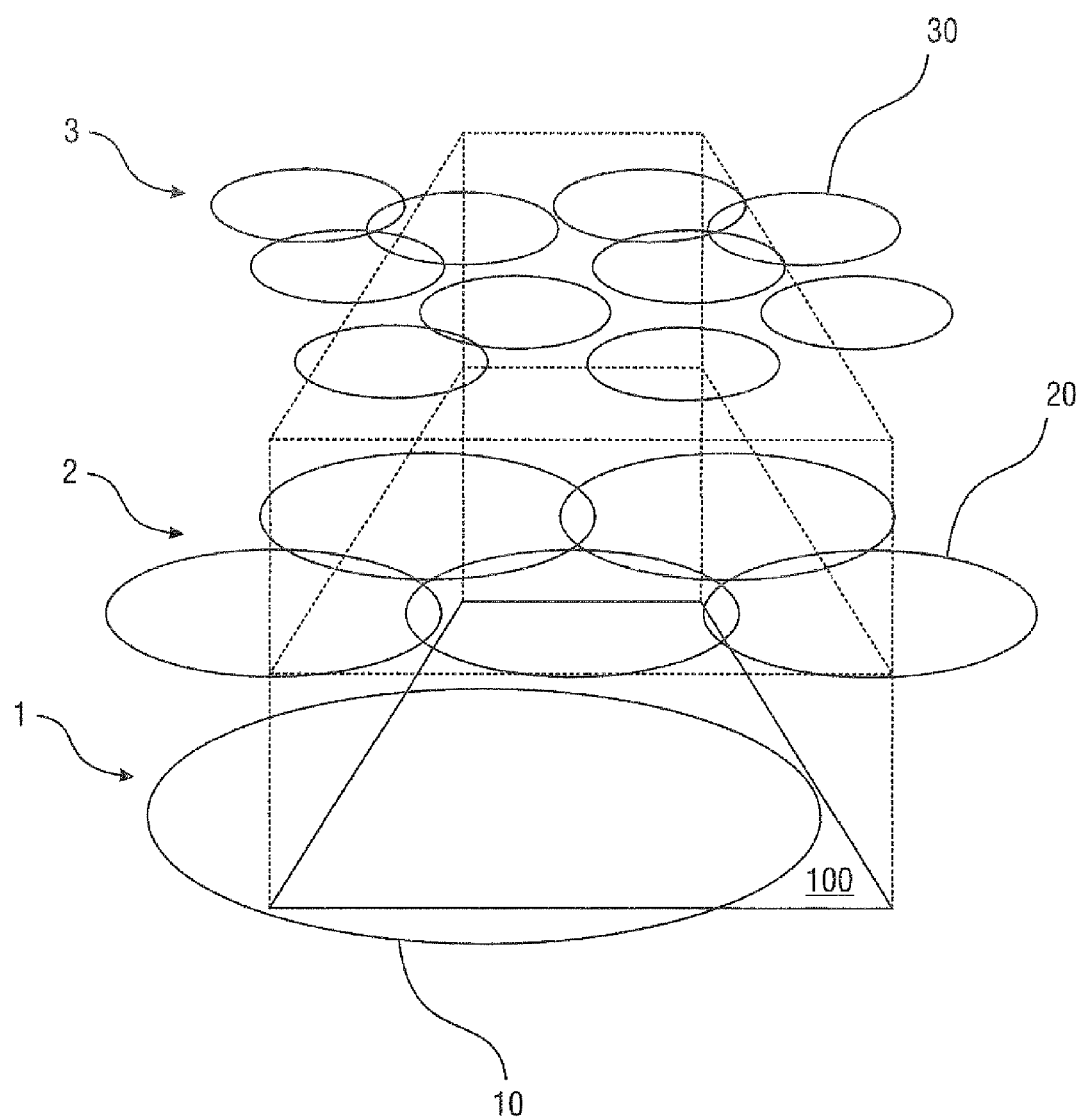
FIG. 1B shows a schematic view of a plurality of access networks in an access area, according to an embodiment of the present invention.

FIG. 1B shows a schematic view of a plurality of access networks being provided in the access area 100. This schematic view shows a first access network 1, a second access network 2, and a third access network 3, all being provided in the access area 100. The first access network 1 is provided in the access area 100 with one cell 10. This cell 10 may cover the entire access area 100 or only parts thereof. The second access network 2 may be provided by one or more cells 20 in the access area 100. Said cells 20 may cover the entire access area 100 and may further overlap within the access area 100. Said third access network 3 is provided with cells 30 in the access area 100 and may comprise a different cell structure than the mentioned first access network 1 and/or second access network 2. It is to be noted that the three-dimensional view of FIG. 1B is to be understood symbolically for depicting a multitude of different access networks 1, 2, and 3, all being provided within the same access area 100 with corresponding or different coverage structures.

Figure 2:
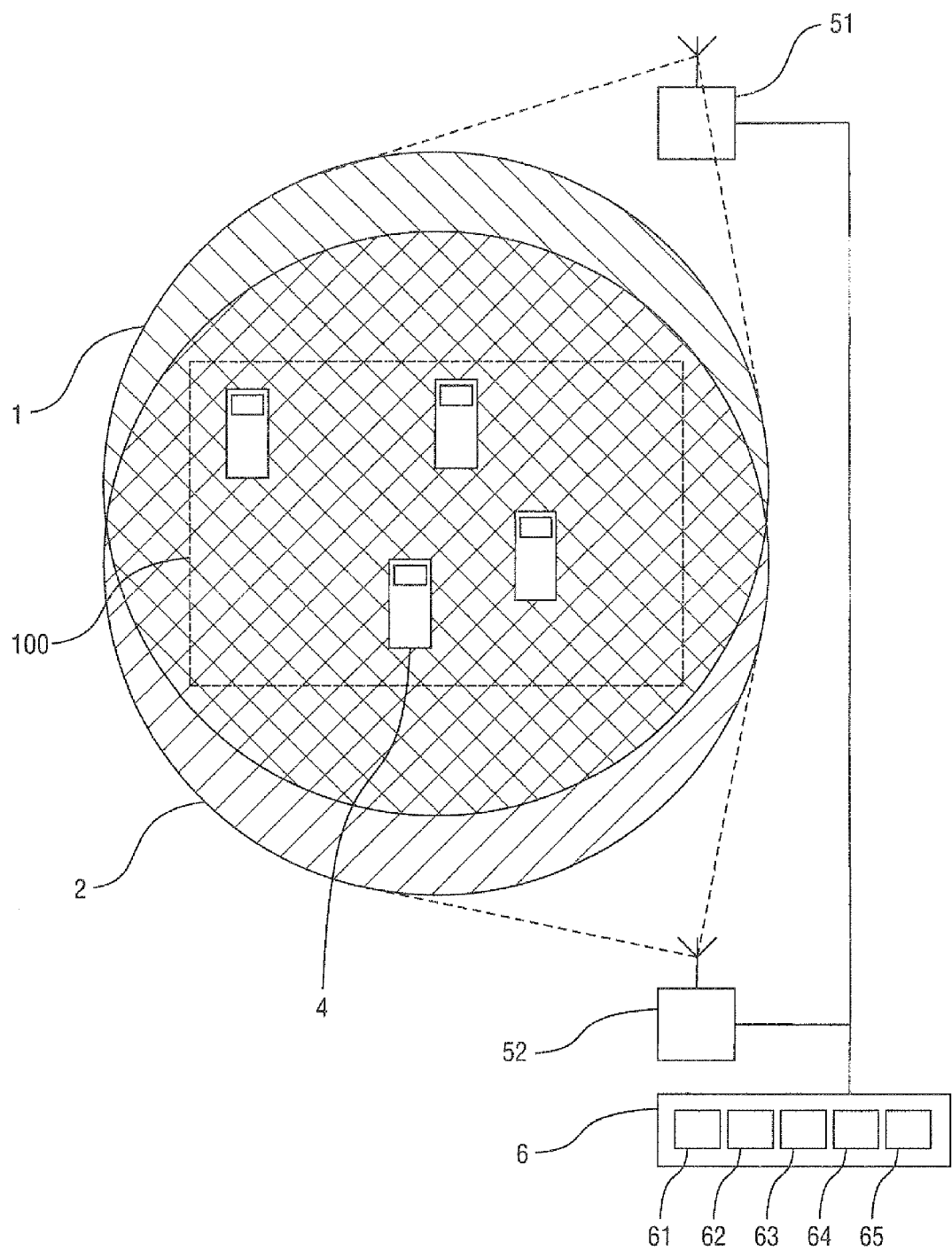
FIG. 2 shows a schematic view of a network entity managing access networks, according to an embodiment of the present invention.

FIG. 2 shows a schematic view of a network entity 6 managing the first access network 1 and the second access network 2, which both serve mobile terminals 4 in the access area 100, according to an embodiment of the present invention. Access to the first access network 1 is provided by a first base station 51, and access to the second access network 2 is provided by a second base station 52. The first base station 51 and the second base stations 52 may serve a plurality of cells within the access area 100.

The term entity refers to any suitable arrangement enabled to provide a described functionality. It may comprise one or more physical devices, i.e. can be a single device (e.g. in a single node or server) or distributed over several devices. The mentioned units or elements can be provided by hardware, software or any suitable combination of hardware and software, e.g. the network entity comprise a data processing apparatus which executes a program such to provide a selecting unit, a steering unit, a sending unit, and/or a setting unit as respective code sections or modules. The first base station 51 and said second base station 52 allow the mobile terminals 4 to communicate with further networks, such as a core network. Therefore, the first base station 51 and the second base station 52 may be coupled to corresponding connections and data paths which connect to such further networks (e.g. a core network) in well known fashion. In addition to this, the first base station 51 and the second base station 52 are coupled to the network entity 6, which, in turn, comprises a selection unit 61, a steering unit 62, a sending unit 63, and a setting unit 64. The entity 6 may also be located in a core-network or within a radio network.

The selecting unit 61 is adapted to select one of the first network 1 and the second network 2 on the basis of a power consumption assessment. For example, the selecting unit 61 of the network entity 6 selects the first access network 1 on the basis of said power consumption assessment, indicating, for example, that it may be disadvantageous to keep the first access network 1 running. This may be due to various reasons, which include the possibility that the second access network 2 consumes less power than the first access network 1 serving all mobile terminals 4 in the access area 100, or a selected number thereof, the possibility that the actual number of mobile terminals 4 in the access area 100 falls below a threshold value below which the provision of service by the first access network 1 may be inefficient, and/or the possibility that the first access network 1 provides services that are currently used only by a minority number of mobile terminals 4 in the access area 100 or may well be substituted by the second access network 2, without significant loss of quality of service.

The steering unit 62 is adapted to generate steering information for the mobile terminals 4 in said access area 100, said steering information indicating to the mobile terminals 4 to preferably use another access network, not being selected by the selecting unit 61. Following the above example, the steering unit 62 may generate steering information indicating to the mobile terminals 4 to preferably use the second access network 2. In this way, the mobile terminals 4 may channel their communication preferably or exclusively via the second access network 2. This may have the result that the mobile terminals 4 avoid the first access network 1 and/or refrain from communicating via the first access network 1.

For sending said steering information, the network entity 6 comprises the sending unit 63, which is adapted to send said steering information to the mobile terminals 4 in the access area 100 including those that are in an idle mode. This is done in any suitable or desirable way with the help of available signaling mechanisms. Therefore, the sending unit 63 is able to send the steering information to the mobile terminals 4 even if these are not in an active mode. It is also possible to establish an active connection for a short period for the sake of transferring the steering information, e.g. sending an IP message. Correspondingly, said sending unit 63 may comprise means for packaging said steering information into messages of a given protocol, such as TCP/IP or the device management protocol (DMP as defined by the so-called Open Mobile Alliance), such that the steering information can be handled transparently by the network entity 6, the base stations 51, 52, communication paths there between, and/or other network entities well known for the communication network technology specifically being used in a given implementation.

The network entity 6 further comprises the setting unit 64 that is adapted to initiate the setting of the selected access network to a power save mode. Following the above example, the sending unit 63 may have already sent the steering information, generated by the steering unit 62, indicating to said mobile terminals 4 to preferably use the second access network 2, and the first access network 1 may not be required anymore in the access area 100. As a result, the first access network 1 may be set into a power save mode.

The power save mode can be chosen in any suitable or desirable way and may include a reduction of the number of the communication channels used by the respective access network, a reduction of transmission power and/or data rate being employed by a respective base station to transmit information to the mobile terminals 4, decreasing a bandwidth of the frequencies being employed to transmit data from a respective base station to the mobile terminals 4, and/or combinations thereof. Setting an access network to a power save mode may further comprise switching off some or all associated base stations, parts thereof, such as selected power amplifiers, and/or corresponding network equipment. However, the power save mode may still allow a remote reactivation of all concerned equipment and communication paths, even if these have been switched off. In such a way, the network entity 6 and/or other network entities may be still able to reactivate, following the above example, the first access network 1 if it is required and/or the selecting unit 61, at a later instance, selects another access network, such as the second access network 2, on the basis of the power consumption assessment.

Figure 3A:
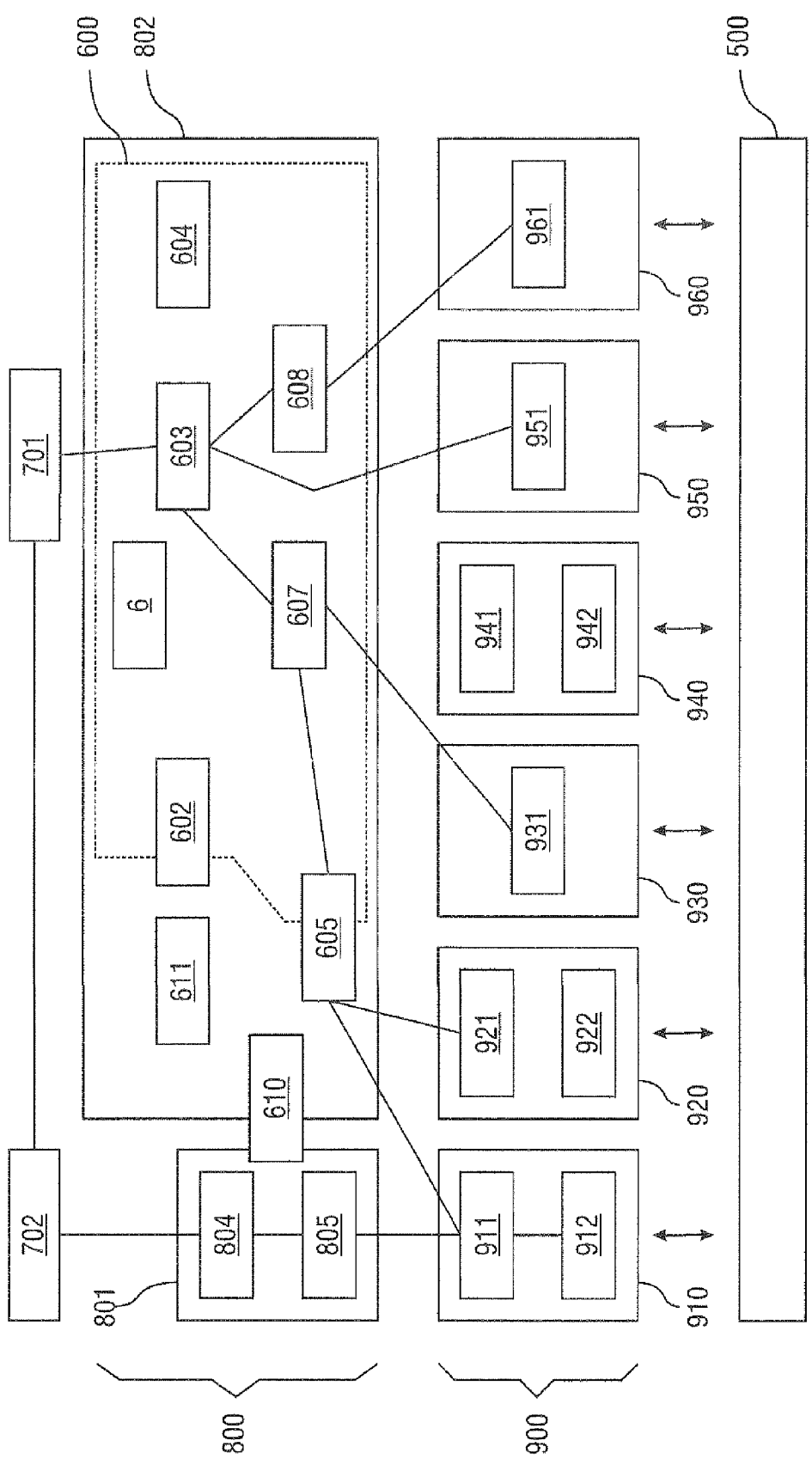
FIGS. 3A through 3C show schematic views of a system architecture for managing access networks, according to embodiments of the present invention.

FIG. 3A shows a schematic view of system architecture for managing access networks. A plurality of mobile terminals or user equipment 500 may be located in one or more access areas. A plurality 900 of access networks may serve all or selected numbers of said mobile terminals 500. In this context, it is noted, that not all mobile terminals of the plurality 500 of mobile terminals may be capable to communicate with more than one or all access networks of said plurality 900 of access networks.

Said plurality 900 of access networks may comprise a first access network 910, which may be a GERAN network, a second access network 920, which may be an UTRAN network, a third access network 930, which may be an E-UTRAN network, a fourth access network 940, which may be a CDMA-2000 network, a fifth access network 950, which may be a trusted non-3GPP access network, and a sixth access network 960, which may be an untrusted non-3GPP access network. In general, the plurality 900 of access networks may comprise access networks which are based on related or identical access technologies, or may be based on different access technologies.

The access networks 910, 920, 930, 940, 950, and 960 may comprise a base transceiver station 912 and/or nodes 922, 931, 942, 951, and 961, for establishing a communication to the mobile terminals of the plurality 500 of mobile terminals. Further, they may comprise a base station controller 911, a radio network controller 921, or a gateway 941 which provide a communication to a core network 800. The first access network 910 may further comprise a base transceiver station 912 for establishing a communication to a mobile terminal of the plurality 500 of mobile terminals.

The core network 800 may comprise a circuit switched domain 801 and a packet switched domain 802. The core network 800 may further be coupled to communication networks 701 and 702, which provide further communication, and may be or comprise communication networks, such as a PSDN network, an ISDN network, a telephony network, or also the Internet.

Within the packet switched domain 802 of the core network 800, there is arranged in the example of FIG. 3A an evolved packet core 600 (EPC), which, in turn, comprises a series of gateways, units, nodes, and servers, such as policy and charging rules function unit 602, a packet data networks gateway 603, a 3GPP (3rd generation partnership project) authentication, authorization, and accounting server 604, a serving GPRS (general packet radio service) support node 605, a serving gateway 607, an evolved packet date gateway 608, and/or a gateway GPRS support node 611. By means of the gateways and nodes 603, 607, and 605, the communication network 701 may be coupled to one or more of the access networks 910 through 960, directly, or by a series of said gateways and nodes 605, 607, 603, and 608.

The packet switched domain 802 may be coupled to the circuit switched domain 801 of the core network 800 and they may share entities, for example a home subscriber server 610. The circuit switched domain 801 may further comprise gateway mobile switching centers 804 and mobile switching centers/visitor location registers 805 for providing communication between the communication network 702 and the GERAN network 910.

According to an embodiment of the present invention, the network entity 6 comprises or is connectable to means for selecting one or more access networks of said plurality 900 of access networks on the basis of a power consumption assessment, means for performing a steering operation for the plurality 500 of mobile terminals in one or more access areas, means for sending steering information to the mobile terminals. The means for selection are associated with a unit for setting the selected access networks of the plurality 900 of access networks to a power save mode. The network entity 6 is part of or connected to the evolved packet core 600. Thus, said sending of the steering information may be effected via one or a group of access networks of the plurality 900 of access networks. Said steering information further indicates to the mobile terminals to preferably use a non-selected access network not being one of the selected access networks from the plurality 900 of access networks.

For example, the network entity 6 selects the first access network 910 on the basis of a power consumption assessment.

Further, the entity 6 performs a steering operation comprising sending steering information to the plurality 500 of mobile terminals indicating to them to preferably use one or more of the non-selected access networks, namely the second access network 920, the third access network 930, the fourth access network 940, the fifth access network 950, and/or the sixth access network 960. The individual mobile terminals of the plurality 500 of mobile terminals may, as a consequence, leave or avoid the first access network 910 and handle all communication via the remainder of the access networks. The entity 6 may then set the first access network 910 to a power save mode. In this way, all communication between the core network 800, and the communication networks 701 and 702, and the mobile terminals may be handled by a limited number of access networks. One or more of the access networks of the plurality 900 of access networks may be put to a power save mode, which may result in a substantial saving of power, energy, and cost.

In another embodiment, the evolved packet core 600 further comprises an access network discovery and selection function 601 (ANDSF) which, in turn, may provide the plurality 500 of mobile terminals with information, such as intersystem mobility policies and access network discovery information. Said intersystem mobility policies may indicate to the mobile terminals to select preferably one or a group of said access networks 910 through 960 of the plurality 900 of access networks. Said access network discovery information may enable a mobile terminal to efficiently recognize the availability of each access network from the plurality 900 of access networks 910 through 960.

Figure 3B:
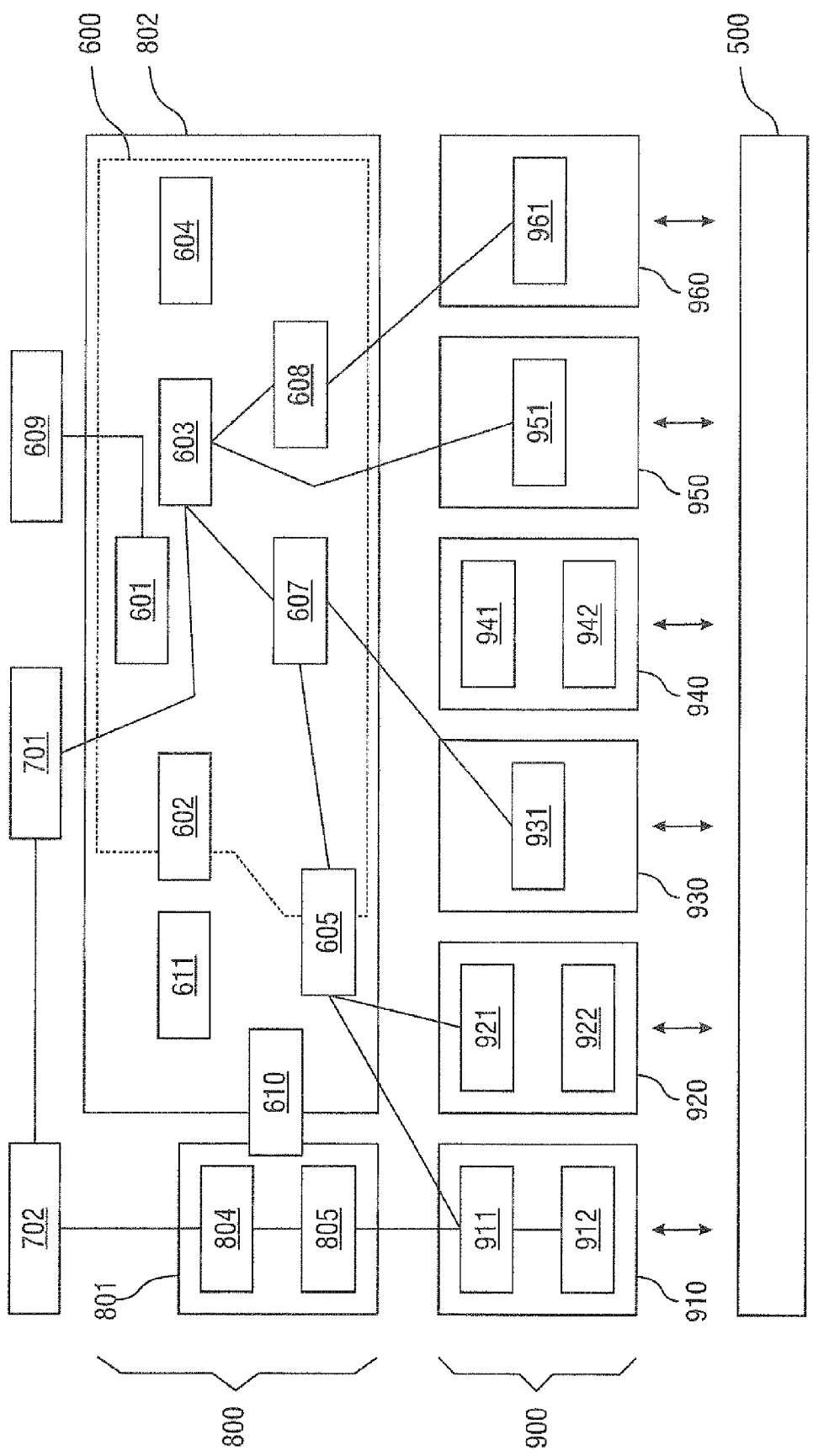

FIG. 3B shows a schematic view of system architecture for managing access networks. According to this embodiment, the access network discovery and selection function 601 is coupled to an assessing and setting entity 609. The assessing and setting entity 609 may conduct a power consumption assessment considering all access networks of the plurality 900 of access networks 900 or only a selected number thereof. For this purpose, the plurality 900 of access networks may report information on state and/or capacity to the assessing and setting entity 609. The assessing and setting entity 609 may conduct said power consumption assessment periodically, after a predetermined time span has elapsed, and/or at the occurrence of specific events. Said power consumption assessment may enable the access network discovery and selection function 601 to select one of said access networks from the plurality 900 of access networks. Said assessing and setting entity 609 may be independent of the core network 800, the packet switched domain 802, and/or the evolved packet core 600. In this way, the power consumption assessment may be conducted in an independent entity or operation and maintenance system and may be sent to the access network discovery and selection function 601 upon request or changes.

The assessing and setting entity 609 may be coupled to the access network discovery and selection function 601, which implements the control of the mobile terminals. It may also be coupled, e.g. by means of the packet switched domain 802 of the core network 800, to the plurality 900 of the access networks for implementing the control of the access networks and to set or change the power save mode of one of the plurality 900 of the access networks. According to another embodiment, however, the assessing and setting entity 609 and the network discovery and selection function 601 may well be implemented together in one entity, such as a server or the network discovery and selection function 601 itself.

Figure 3C:
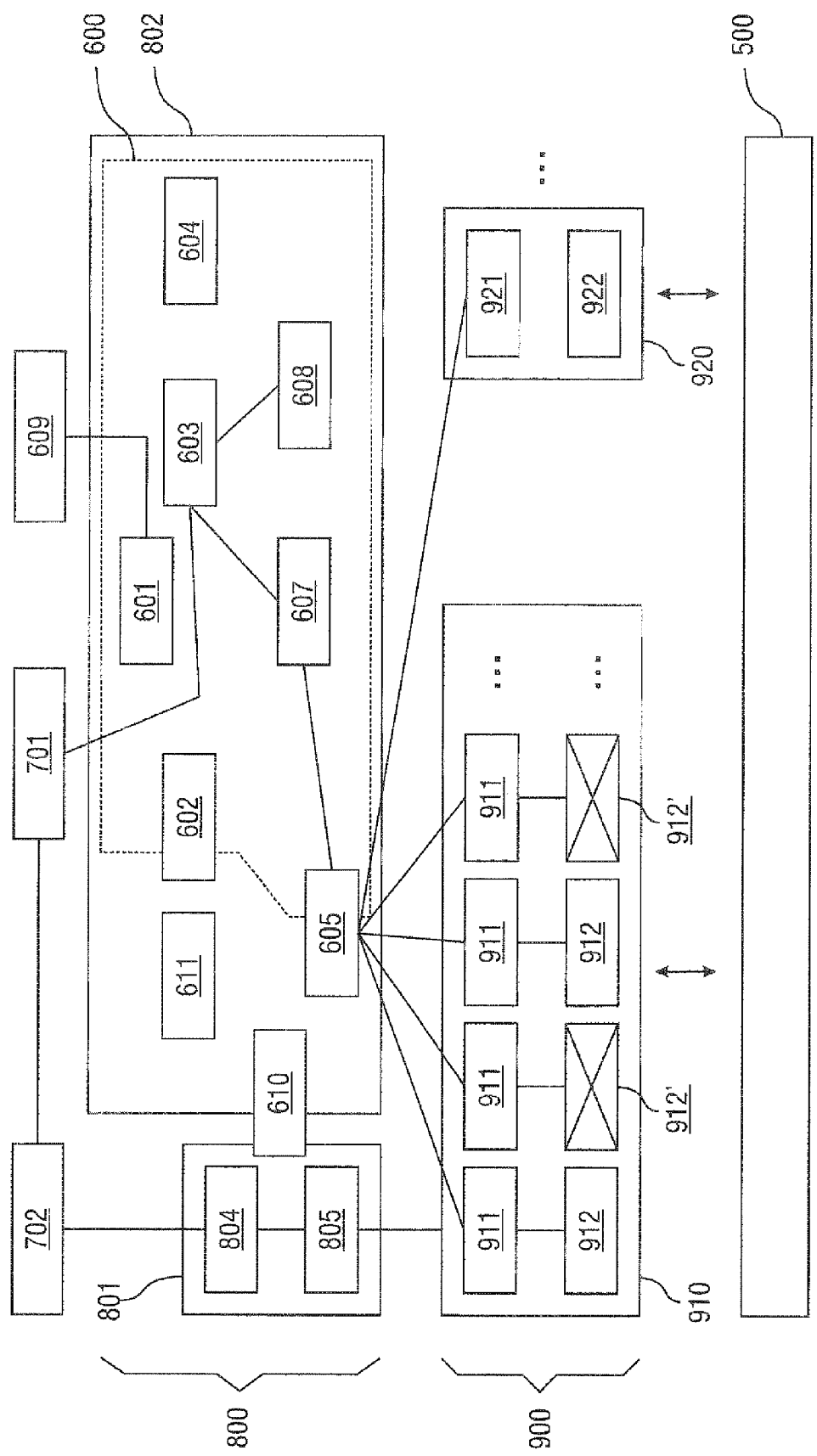

FIG. 3C shows a schematic view of a system architecture for managing access networks. According to this embodiment, the first access network 910 comprises a plurality of gateway units 911, and a plurality of base transceiver stations 912. In the case that the assessing and setting entity 609 sets the selected access network 910 to a power save mode, the entity 609 may instruct the first access network 910 such to put a specific number of base station transmitters 912' to a power save mode. In this way, the first access network 910 may still provide service to mobile terminals of the plurality 500 of mobile terminals, or only to a limited number thereof, by means of the base station transmitters 912 which are kept active. At the same time, however, energy and power consumption may be saved since the disabled base station transmitters 912' do require no or only substantially reduced power.

Figure 4B:
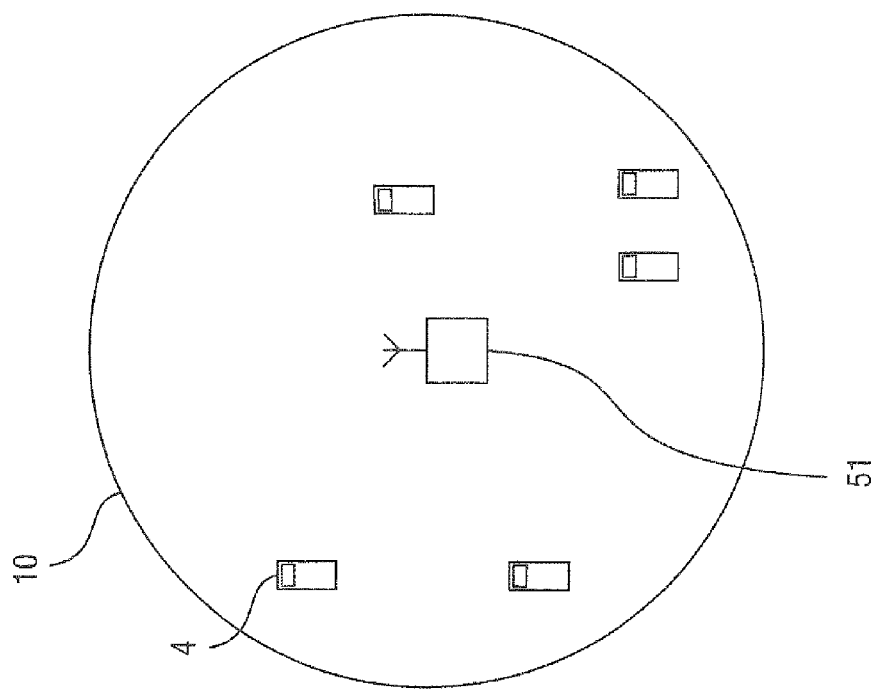
FIGS. 4A and 4B show a schematic view of a scenario of managing access networks, according to an embodiment of the present invention.
Figure 4A:
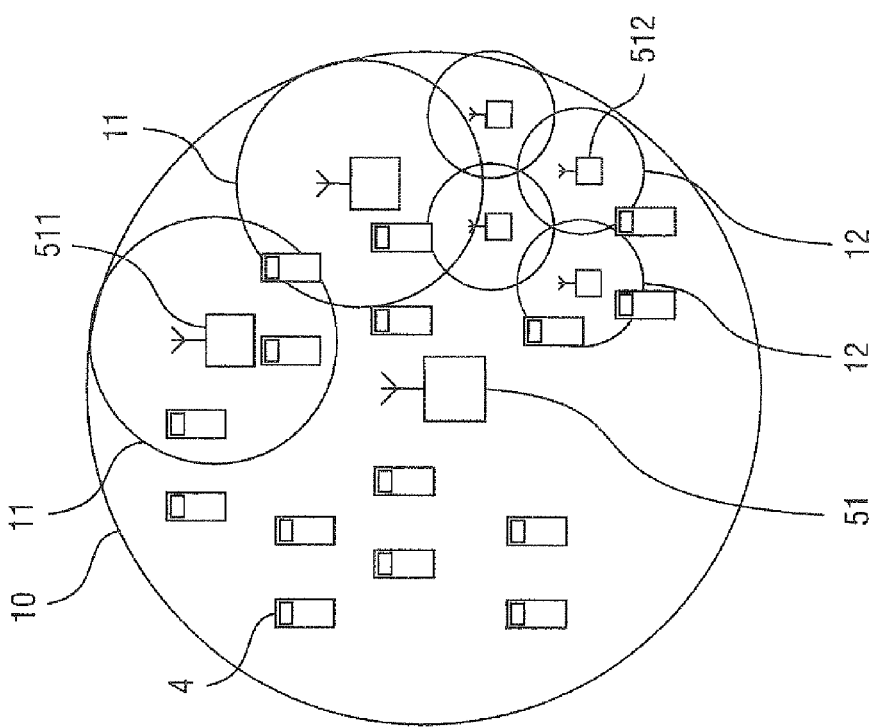

FIGS. 4A and 4B show a schematic view of a scenario of managing access networks. According to this embodiment, a base station 51 provides a cell 10 of an access network. Within the cell 10 there may be arranged micro-cells 11 and/or pico-cells 12. The micro-cells 11 may be provided by means of subordinated base stations 511, where the pico-cells 12 may be provided by subordinate base stations 512. These subordinate base stations 511, 512 may act as independent base stations or as repeaters for the base station 51. The micro-cells 11 and/or the pico-cells 12 may be arranged such that they overlap and/or span the entirety of the cell 10 or a part thereof.

As depicted in FIG. 4A, a first number of mobile terminals 4 in the cell 10 justify an activation of all subordinate base stations 511, 512. The additional power being consumed may be justified, due to the fact that the high number of mobile terminals 4 may not be served by the base station 51 alone without worsening quality of service substantially and/or because a minimum service quality is to be provided to the mobile terminals 4. The shown configuration depicts the access network being in a first operation mode which may be identified as an operation mode being different from a power save mode.

FIG. 4B shows the same access area with a reduced number of mobile terminals 4 with respect to the configuration as has been described in conjunction with FIG. 4A. The reduced number of mobile terminals 4 within the cell 10 may be well served by the base station 51 alone, and, as a consequence, the subordinate base stations 511, 512 may be put to a power save mode or may be entirely switched off. As a consequence, no or only a limited number of micro-cells 11 and/or pico-cells 12 are provided within the cell 10. By means of serving the mobile terminals 4 by the base station 51 only, and putting the subordinate base stations 511, 512 to a power save mode, overall power consumption being required to serve mobile terminals 4 within the access area 100 may be substantially reduced. The configuration as shown in FIG. 45 may correspond to a second operation mode of the access network and may be identified as a power save mode.

Figure 5A:
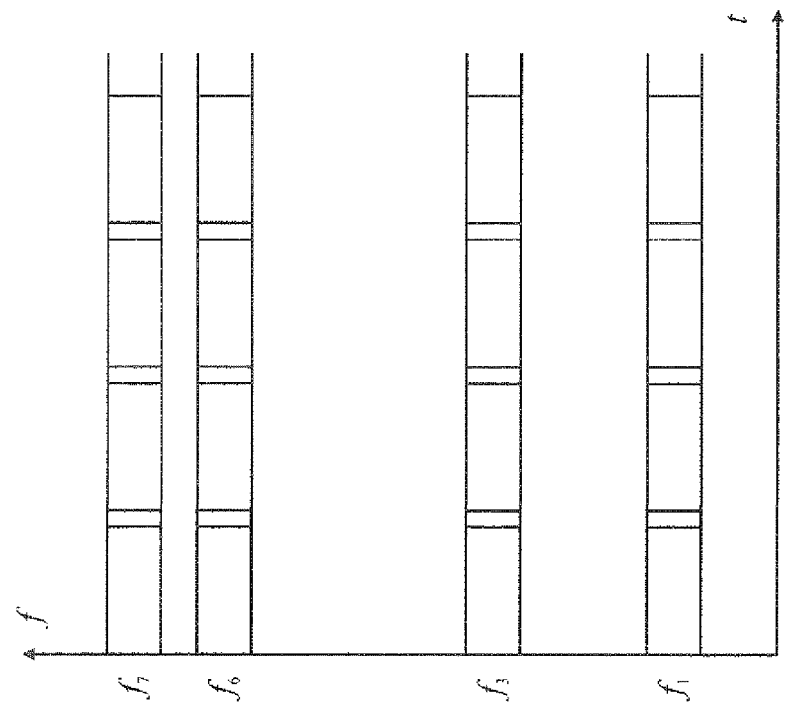
FIGS. 5A and 5B show a schematic view of a scenario of managing access networks, according to an embodiment of the present invention.
Figure 5B:
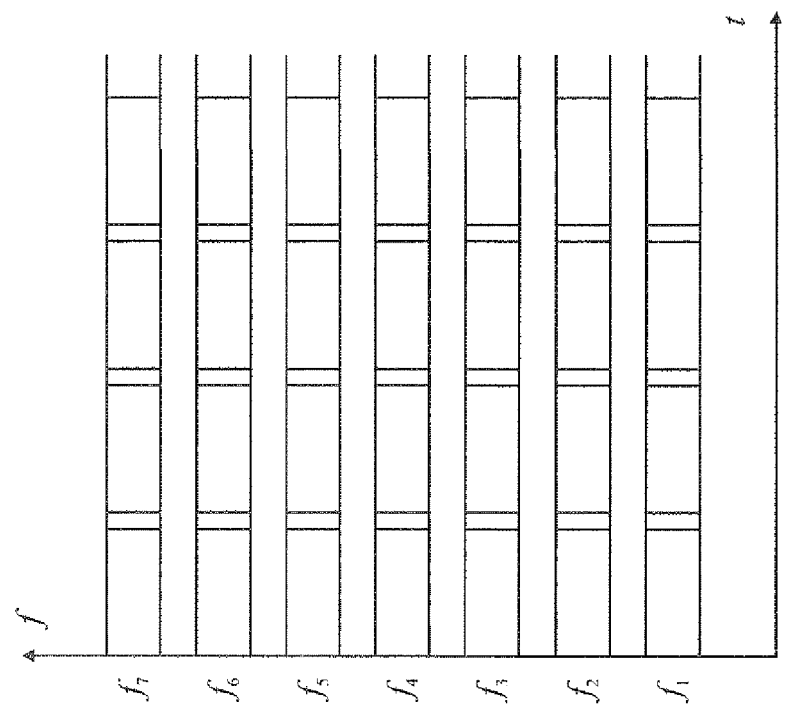

FIGS. 5A and 5B show a schematic view of a scenario of managing access networks. According to this embodiment, the access network provides seven frequency bands $f_1$ through $F_7$ for data transmission and reception. Since the provision of each frequency band $f_1$ through $f_7$ requires transmission power and power for operating the respective transmission equipment, this first operation mode corresponds to an operation mode which is different from a power save mode.

As shown in FIG. 5B, however, the access network may be operated in a second operation mode while providing only a limited number of frequency bands as shown, for example, the frequency bands $f_1$, $f_3$, $f_6$, and $f_7$. Following this example, the frequency bands $f_2$, $f_4$, and $f_5$ have been switched off, and, hence, do not provide data transmission and/or reception. Since transmission is carried out only at a limited number of frequency bands, parts of the transmission equipment may be switched off, and, hence, the access network may be run in a mode which corresponds to a power save mode.

Figure 6B:
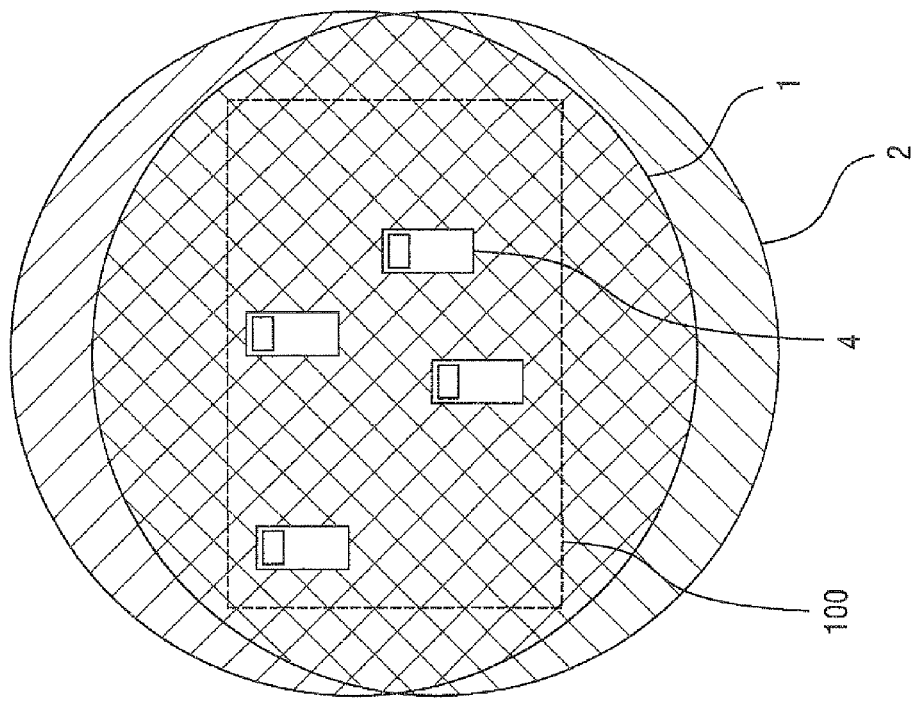
FIGS. 6A and 6B show a schematic view of a scenario of managing access networks, according to an embodiment of the present invention.
Figure 6A:
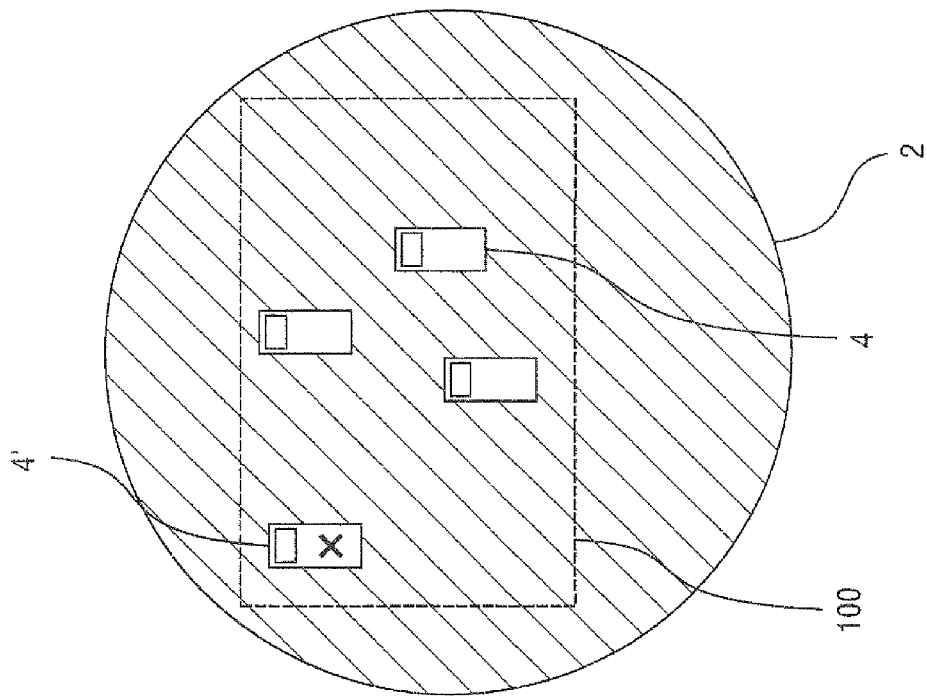

FIGS. 6A and 6B show a schematic view of a scenario of managing access networks. As shown in FIG. 6A, a number of mobile terminals 4 are located in an access area 100 that is in turn provided with a first access network 1 and a second access network 2. According to this embodiment, the first access network 1 is being selected on the basis of power consumption assessment, and, accordingly, is set to a power save mode. The mobile terminals 4 within the access area 100 are provided with steering information indicating to them to use, preferably, the second access network 2.

As shown in FIG. 6B, however, not all mobile terminals 4 within the access area 100 are able to communicate via the second access network 2 or at full quality of service. For example, the mobile terminal 4' is unable to communicate with the second access network 2, and, hence, loses communication service within the access area 100. According to this embodiment, the number of mobile terminals 4' which are unable to communicate via the non-selected access network, in this case the second access network 2, or which receive only a lowered quality of service, e.g. a lowered data rate for transmission, may be determined prior to setting the selected access network to a power save mode. In conjunction with the overall number of mobile terminals 4, 4' in the access area 100, it may be judged whether or not the setting of the respective selected access network to a power save mode may be tolerable with respect to the number of mobile terminals 4' in the access area 100.

As an example, it may be tolerable to neglect a number of mobile terminals 4' which are not able to communicate via an access network which is to be put into a power save mode, if the total number of mobile terminals 4' represent less than 0.5%, less than 1%, or less than 10% of the overall number of mobile terminals 4, 4' being located in the access area 100 at a given time. In this way, a trade-off may be achieved between providing a given service quality and ensuring power efficiency, reducing energy and power consumption. The actual figure of defining how many mobile terminals 4' are tolerable to be excluded from access service or to receive a lowered quality of service may be defined in terms of an absolute value or a fractional figure, the latter giving a tolerable number of mobile terminals 4' with respect to the actual number of mobile terminals 4, 4' which are located in the access area 100.

Figure 7A:
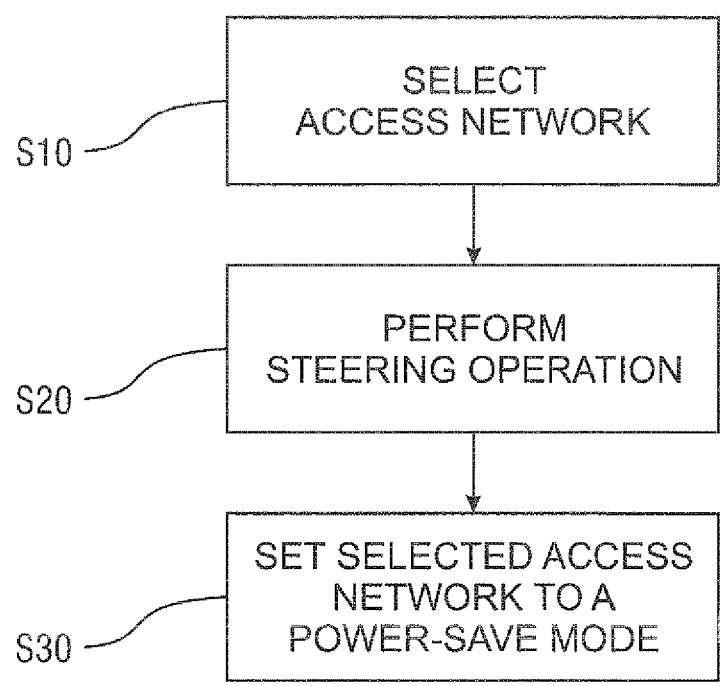
FIGS. 7A and 7B show schematic flow charts of methods according to embodiments of the present invention.
Figure 7B:
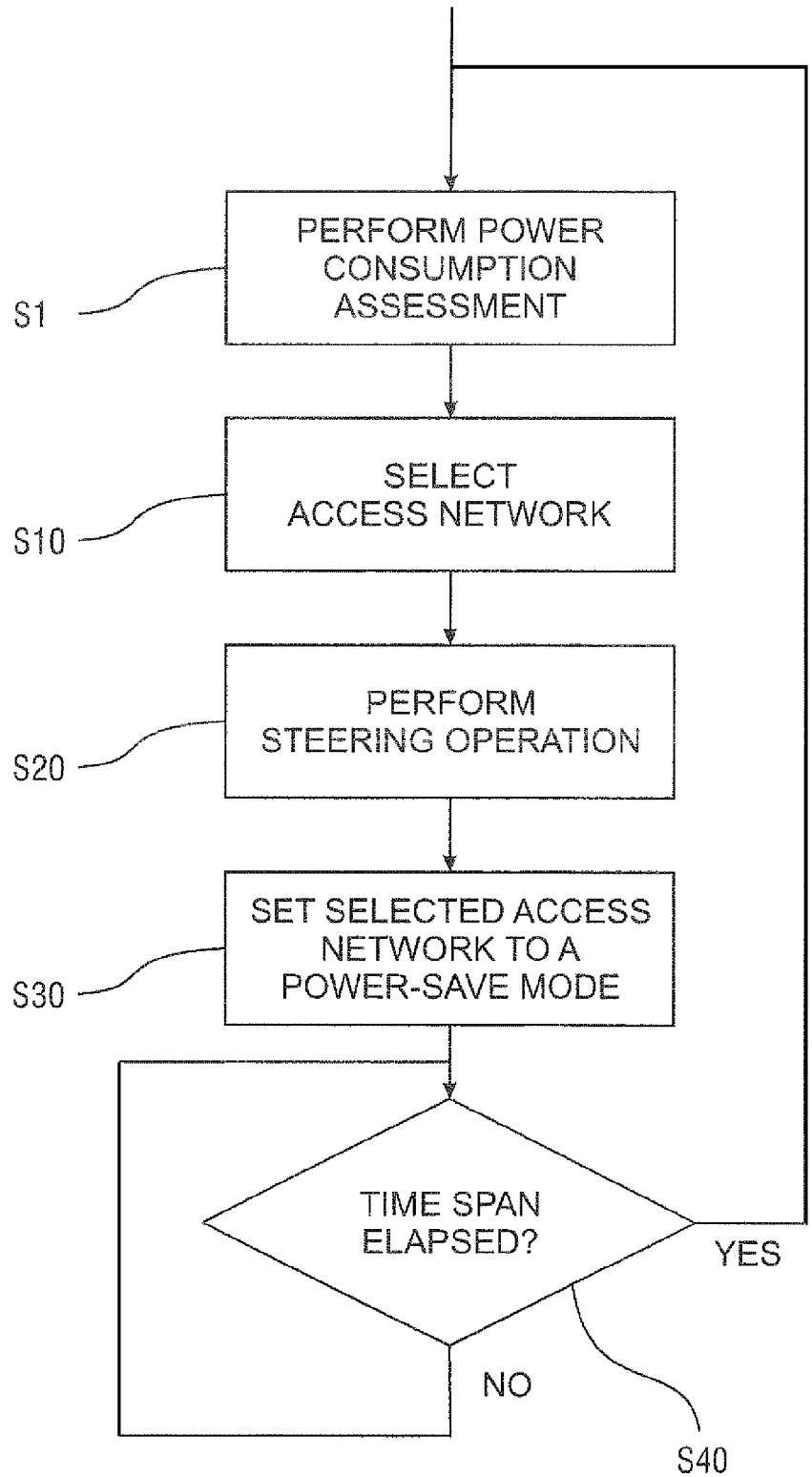

FIGS. 7A and 7B show schematic flow charts of methods according embodiments of the present invention. As shown in FIG. 7A at least one access network is selected on the basis of a power consumption assessment in a first step S10. As a second step S20, a steering operation is performed which comprises sending steering information to the mobile terminals that are located in a respective access area, wherein the steering information indicates to the mobile terminals to preferably use a non-selected access network not being selected in the first step S10. In a third step S30, the selected access networks are set to a power save mode.

For one embodiment, the power consumption assessment is based on a power consumption metric. Such a metric may include a metric for the sustainability impact of the access system, optionally considering operation modes of the access system. The metric may further comprise a static LCA impact, which may substantially determined by the sheer provision of service, and also may comprise an operation-dependent LCA impact, which also considers a certain load and/or a traffic mix.

The power consumption assessment may further comprise an evaluation of a demand of communication traffic in the access area and an evaluation of a capacity of communication traffic in the access area. In this way, the power consumption assessment may also consider actual demand and capacity which, in turn, may influence the selecting of an access system. If data on demand and capacity are known, determining of operation-dependent power consumption figures, such as a power consumption metric comprising an operation depending LCA impact, may be possible and the power consumption assessment may be rendered more accurate.

For another embodiment, the power consumption assessment may comprise conducting an optimization procedure, wherein power consumption is optimized while using at least a part of the evaluated capacity and providing at least a part of the evaluated demand. In this way, the optimization procedure may e.g. be realized as a linear allocation problem, in which the required power consumption of serving a given number of mobile terminals by a respective access network is identified as a partial cost. The optimization is then conducted by means of optimizing or minimizing the accumulated cost, being the sum of all partial costs, while meeting the boundary conditions of providing at least a part of the evaluated demand and using at least a part of the evaluated capacity. Said optimization procedure may consider a single access area, a group thereof, or entire access network systems, such as an entire network being operated by a single operator or a group of such networks.

Furthermore, the power consumption assessment may comprise analyzing recorded power consumption data, i.e. making an assessment based on history. Said recorded power consumption data may include power consumption figures of single access networks at specific times-of-day or in conjunction with specific events. Analyzing such recorded power consumption data may therefore provide a forecast of actual power consumption, and, in this way, may substantially support the power consumption assessment. Furthermore, the power consumption assessment may be independent from collecting actual, recent power consumption figures. Hence, communication, network, and computational power may be saved, while still providing an accurate and sensible power consumption assessment.

For another embodiment, the power consumption assessment comprises considering expectation values. Such expectation values may be based on heuristic data and/or may comprise periodical schedules, the latter being, for example, structured relative to specific times-of-day, and may, therefore, provide a sensible power consumption assessment without the need for collecting actual, recent power consumption data. Said expectation values may further comprise the occurrence of specific, predetermined events, such as mass gatherings (e.g. sports events), which may occur in the access area and may cause a substantial increase or decrease of communication demand in the respective access area.

For yet another embodiment, the power consumption assessment comprises providing access network service to a selected number of mobile terminals in the access area. In this way, the power consumption assessment may consider an actual or calculated number of mobile terminals that are located in the access area. Said assessment may further comprise determining the ability of said mobile terminals to be served by one of the access networks or the quality of service which they are able to receive. As a consequence, it is possible to estimate or calculate a number of mobile terminals that will lose service or receive a lowered quality of service when the selected access network is set to a power save mode. Providing access network service to a selected number of mobile terminals in the access area may, therefore, comprise a maintaining of a minimum quality of service and/or consider the possibility to trade off losing a number of mobile terminals in a respective access area versus saving energy. The selected number may be defined in absolute terms or as a fractional figure of an overall number of mobile terminals in the access area.

The steering operation comprises sending steering information that indicates a preference. This can be done in any suitable or desirable way, and according to another embodiment, may comprise setting of preferences being stored in the mobile terminal. In this way, it may be indicated to the mobile terminals to preferably use the non-selected access network and/or not to use the selected network, however without forcing the mobile terminal to any action. In this way, the mobile terminal still has the possibility to edit, view, or influence the selection of a respective access network. The user or terminal is, therefore, able to adapt the managing of the available access networks to his/her own needs, taking into account, for example, specific requirement for battery life and/or data rates.

Performing the steering operation may comprise more specifically for example to send lists of allowed or forbidden access networks to the mobile terminals, e.g. concerning the access networks of a specific operator. It is also possible to allow or forbid specific access technologies, for example WLAN. Furthermore the steering information may comprise specific rules or conditions for selecting the access networks or technologies, e.g. that a specific network is to be used preferably during a specific period of the day. In particular the steering operation may also comprise priority lists for different access networks and technologies, for example that 3GPP networks should be preferred over WLAN networks or UMTS accesses over GSM accesses. Any combinations of such indications are possible.

While the terminal controls and initiates the access selection, this selection process depends on the received steering information. It may correspondingly be ensured that the mobile terminals use non-selected access networks, independent of user or terminal preferences, for example by adding the selected access network or the corresponding access technology to a list of forbidden networks or technologies. It may be, therefore, achieved that a maximum number of mobile terminals in the access area follow the steering information, a maximum number of mobile terminals use non-selected access networks, and a minimum number of mobile terminals in the access area lose connectivity by setting the selected access network to a power save mode.

FIG. 7B shows the method of according to a further embodiment. Steps S10, S20, and S30, are the same as they have been described in conjunction with FIG. 7A, such that a repeated description is not necessary. They are embedded in a continuous loop, and, therefore, are executed repeatedly. In an initial step S1 a power consumption assessment is performed, on which selecting an access network in the step S10 may be based. After the steering operation has been performed in step S20 and the selected access network has been put to a power save mode in step S30, a time span is awaited in a delay loop S40. When the time span has elapsed the method is again executed starting from step S1 and, as a consequence, a next power consumption assessment is performed. On the basis of this power consumption assessment, the same or a different access network may be selected in step S10, corresponding steering operation may be sent to the mobile terminals in step S20, and the same or another selected access network or networks may be set to a power save mode in step S30.

The time span which is awaited in step S40 may be below 10 minutes, below 1 hour, below 12 hours, or below or above 24 hours. In this way, the power consumption assessment may be performed repeatedly, and, may take into account time-of-day characteristics of the respective access networks and their usage, of the mobile terminals, the habits of the users of the mobile terminals, peak hours, day and night times, and/or specific events. In this way, the power consumption assessment in step S1 may provide a sound and sensible basis for selecting an access network in step S10.

According to this embodiment, the method of operating the access networks comprises conducting the power consumption assessment. In this way, the method may continuously or periodically conduct said power consumption assessment in on-going fashion, in order to, for example, adapt the power consumption assessment to recent situations. Such recent situations may include actual demand figures, updated equipment characteristics, and/or specific events. On the other hand, it is to be noted that this is only an example and the power consumption assessment may be independent of the control method. Therefore, for example, the power consumption assessment may be conducted once (e.g. initially when the different access networks are planned and installed) and may be valid for a predetermined period. In this way, the method of operating the access networks may be run independently of conducting the power consumption assessment, releasing communication, network, and computational power. As an example, the power consumption assessment can be or comprise a fixed piece of information (e.g. that a certain network consumes a certain amount of power on average) or a fixed rule (e.g. that a certain access network is to be turned on or off at a certain time of day).

Figure 8:
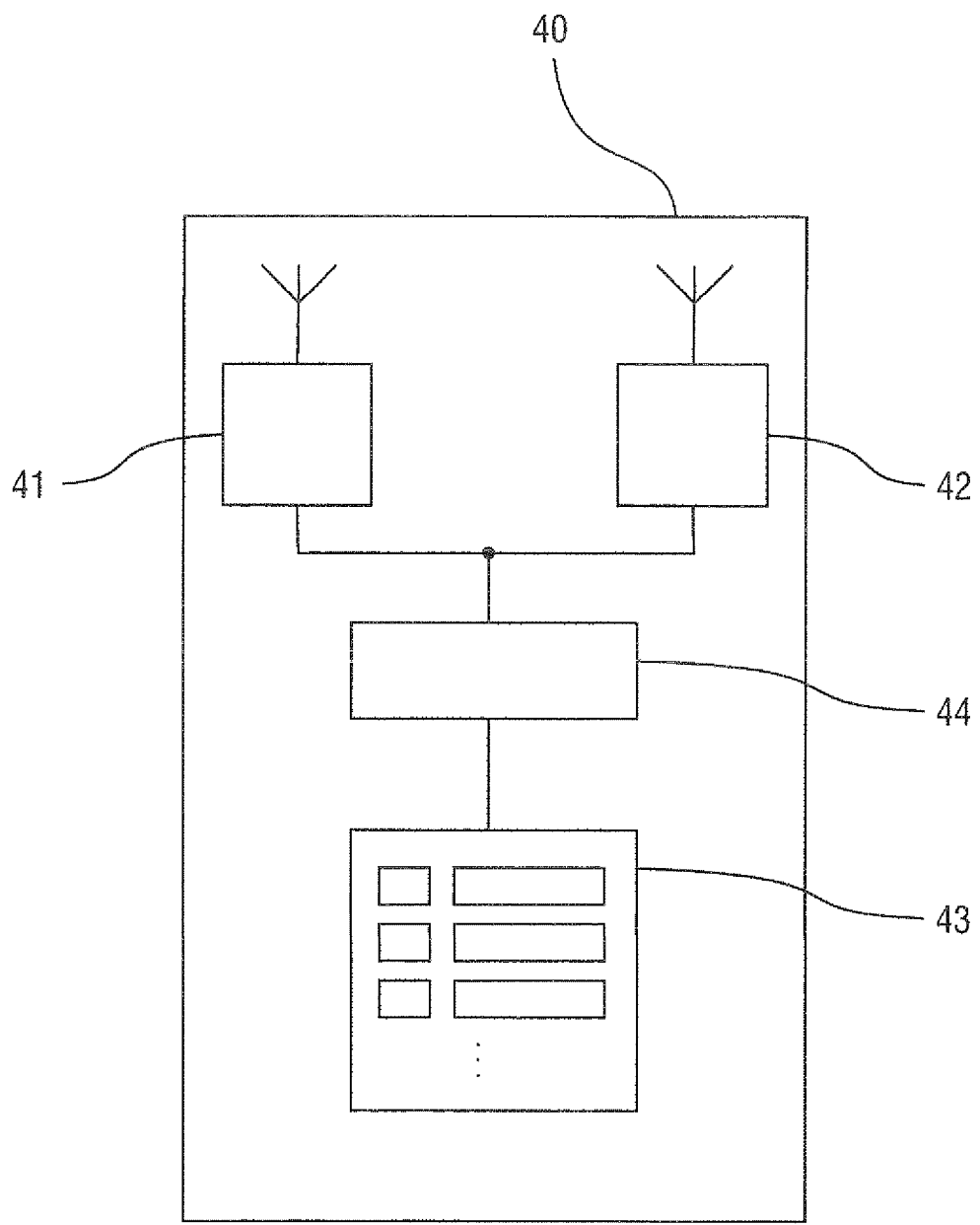
FIG. 8 shows a schematic view of a mobile terminal, according an embodiment of the present invention.

FIG. 8 shows a schematic view of a mobile terminal 40, being adapted to be served by more than one access network. The mobile terminal comprises a first transceiver unit 41 and a second transceiver unit 42, which provide a communication via a first access network and a second access network, respectively. The mobile terminal 40 further comprises a network indicator 43, e.g. a memory, which indicates to the mobile terminal 40 which access network is to be used preferably. Entries in the network indicator 43 and a preferred access network stored therein may be effected by means of receiving steering information, which may be generated and/or sent as has been described in conjunction with an embodiment of the present invention. Furthermore, the network indicator 43 may well instruct the mobile terminal 40 which access network is to be used and/or which other access network is not be used. Based on the steering information and/or the entry in the network indicator 43 and further information, such as measured access network properties, like signal strength, or user settings, a selector 44 selects one or more access networks.

As can be seen, according to one or more embodiments of the present invention, user networks (a mobile terminal is an example of a user network) receive steering information for selection of the access networks in order to reduce the LCA footprint of a multi-access system by adapting the usage of different access networks to operating parameters and thus reducing the LCA footprint and by exploiting the different characteristics of different access networks with respect to their LCA footprint (in certain operation regimes) and selectively using those access networks with the best characteristics.

According to another embodiment of the present invention, for an access area (this might be the area covered by the multi-access system or any part of such an area), the following steps can be performed:

Determine the traffic demand, traffic requirements; Optionally (in particular for a migration period while not all users support all access networks), determine requirements of what access networks are supported by the user network;

Determine the available access networks and characteristics, for example capacity and performance, e.g. the present traffic via an access network, static LCA impact (e.g. energy efficiency), operation-dependent LCA impact (e.g. LCA of using this access at a certain load, traffic mix);

Determine which access network(s) or combination(s) of access networks are suited to the traffic demand in order to reduce the LCA impact while providing the required capacity/capabilities. Optionally, the determination can consider also different modes of operation of the access networks; optionally, ensure that at least a certain percentage of user networks have useable access networks available.

This implies, that for the sake of energy saving it may even be tolerated that a certain number of user networks are rejected from being served. For example, if 99% of first user networks can be efficiently served with a first access system, at the same time the further 1% of user networks require or could benefit from a further access system (e.g. because they do not support the first access system or the first access system has insufficient capabilities), then it may be desirable to accept that the further 1% of access networks has a reduced service or fails to receive service and operate the whole network in an energy efficient mode by disabling the further access system, rather than enabling the further access system, which would provide service to the further 1% of user networks, however, at a comparatively high price of energy consumption.

One may then select the best suited access networks or combinations from the determined access network(s) or combination(s) in the access area which are enabled/switched on (i.e. not in power-saving mode). The selection can be performed in particular based on comparisons of the accumulated LCA impacts for different alternatives of access networks fulfilling the traffic demands.

Then one may steer the user networks via known access control mechanisms (e.g. 3GPP cell re-selection priorities and inter-RAT handover control and/or 3GPP Access Network Discovery and Selection inter-RAT mobility policies) that user networks are steered to the access networks which are enabled according to the selection.

Finally, one may switch off/disable/put in power-saving (Note that an access network may have multiple access power-saving modes, so this step can comprise switching from one type of power-saving mode to another type of power-saving mode. An example is: switching off some frequency layers (e.g. use only macro cells and not micro cells) or switching from MBSFN (multicast, broadcast single frequency network) to a unicast transmission mode—or reducing the area of MBSFN transmission (and thereby reducing the number of simultaneous senders.)) mode access networks which are not selected or are currently not needed to serve user and/or traffic requirements.

According to another embodiment of the present invention, efficient power-saving modes can be added to access systems, which are used e.g. at low or intermediate traffic load levels. A macro base station can provide a certain capacity in a macro radio cell, which can also be covered by micro- or pico-cells provided by remote radio units (RRU). The usage of the micro-cells via RRUs can boost the total capacity in the cells, at the cost of increasing the required energy consumption for the operation of base stations. One mode of operation is to disable all or some RRUs and serve users in the coverage area of disabled RRUs instead via the macro base station. If the traffic load for the macro base station exceeds a threshold, one or more RRUs can be enabled to take over some load and increase the system capacity.

The above steps can for example be performed in selected intervals of time or at specific events, e.g. when a user network enters or leaves the access area or is switched on or off, when a service is initiated, or when a certain load threshold is exceeded, or when time-of-day is reached (e.g. beginning/end of busy hour).

According to yet another embodiment of the present invention, a communication system of a 3GPP operator may have a 3GPP access system with a system of additional WLAN-hotspots. It is determined that the transmission demand outside busy-hour (e.g. at night) is sufficiently provided by the 3GPP access system. The WLAN system can also provide sufficient capacity, however, only at certain areas, with poorer quality of service and total higher power consumption compared to the 3GPP access system. For this reason, the 3GPP access system is considered superior compared to the WLAN access system with respect to the LCA impact in this example (The LCA impact (e.g. power efficiency) metric does not need to be based on measurements; in the simplest case it is based on past experience or common knowledge. The control procedure can then be based on corresponding stored values, e.g. given as a power efficiency metric). As a result, a control procedure disables the WLAN system during night to save energy consumption.

An embodiment of this invention may enable a "master access system", which provides good coverage, operates in an energy efficient mode (possibly at lower frequency bands to reduce path loss) and provides basic service capabilities up to a certain traffic demand, traffic mix, load, and disable all other access systems. In the same way, service capabilities can be reduced when the traffic demand falls below a predetermined threshold value. Once the traffic demand exceeds a threshold, a secondary access system is enabled which is classified as second-best access system with respect to its capabilities and energy efficiency (e.g. 3GPP GERAN). The traffic demand is then served by the master access system and the secondary access system. If traffic demand increases beyond a second threshold, a third-best access system is enabled in a similar way. This can be extended to an arbitrary number of access systems. Different access systems can hereby differ in their radio access technology, but they can also use the same radio access technology but differ in their carrier frequency and/or the carrier bandwidth.

The access system control function that is controlling the configuration of an access system and determines if different transmission modes are used or if the access system is enabled or disabled is typically an O&M (Operation & Maintenance) function. In the context of self-organizing and self-configuring networks, this functionality may also be distributed to the RAN (Radio Access Network) systems (e.g. each RAN system having such a function which functions are inter-connected). In order to redirect user networks away from access systems that are about to be disabled, or redirect them to access systems that have been enabled, the access system control function is preferably connected to user network steering functions. Such functions can be the MME/SGSN for 3GPP access systems, which then provides UE steering information to GERAN/UTRAN/E-UTRAN access systems accordingly to perform the steering of user networks. Alternatively the access system control function could have a direct interface to RAN user network steering functions which modify/filter MME/SGSN user steering information accordingly. For non-3GPP access systems, the traffic steering function can be an ANDSF which directly steers the user networks. The ANDSF could be controlled by the access system control function according to the usage of access systems (or access system modes) User network steering can also be initiated by access system preference information stored in user data bases (either HSS (Home Subscriber Server) or Subscriber Profile Registry (SPR)); the access system control function can in one embodiment control the access system preference information stored in the HSS or SPR.

In one embodiment the access system control function provides prior to switching off an access system the affected user networks with policies (e.g. inter-system mobility policies and/or access network discovery information via the ANDSF) so that the user networks switch off the radio modems of the disabled access systems. Thereby also the energy consumption of the user networks is reduced.

Thus, in general terms, the invention may relate to a communication system comprising at least one access system that provides connectivity to mobile terminals. It is proposed to perform the steps of determining the transmission demand and/or requirements of the mobile terminals within an access area; determining the transmission capacity and/or characteristics of the access system with respect to the transmission demand and/or requirements; determining a metric for the sustainability impact of the access system, optionally considering operation modes of the access system; determining at least one option for a set of access systems (and optionally operation modes) that fulfills (optionally to a specifiable level) the transmission demands and requirements; selecting the set of access systems (and optionally operation modes) that results in the lowest aggregate metric of sustainability impact; switching the not-selected access systems off or into a sleep mode (of possible multiple modes). Optionally also the modes off access systems in the selected set can be adapted.

This can be further combined with actively steering mobile terminals from the not-selected access system to the selected access system prior to putting it/them to sleep mode, e.g. according to the mechanisms currently standardized in 3GPP for "inter-RAT cell re-selection", "IRAT handover" and "access network discovery and selection"; first determining the RAT capabilities of UEs (e.g. according to existing 3GPP mechanisms) and determining which access systems cannot be put to sleep mode without dropping service to UEs different options of defining a metric for sustainability, e.g. total used power, some CO2-equivalent measure, etc.

The present invention may provide advantages such to improve the energy efficiency of multi-access networks, reduce the environmental impact (LCA footprint) of communication networks, and/or reduce the total costs of ownership for a network operator.

The preceding description only describes exemplary embodiments of the invention. The features disclosed therein and the claims and the drawings can, therefore, be important for the realization of the invention in its various embodiments, both individually and in any combination. While foregoing is directed to embodiments of the present invention, other and further embodiments of this invention may be devised without departing from the basic scope of the invention, the scope of the present invention being determined by the claims that follow.

The invention claimed is:

1. A method of operating a first access network and a second access network in a multi-access system, said access networks serving mobile terminals in an access area, the method comprising:

selecting one of said first access network and said second access network to be set to a power-save mode on the basis of a power consumption assessment, wherein said power consumption assessment comprises an assessment of whether setting the selected access network to the power-save mode will reduce the overall power consumed by said access networks, said multi-access system, or both, while still fulfilling defined demands, requirements, or both of communication traffic in the access area;

performing a steering operation for the mobile terminals in said access area, comprising sending steering information to the mobile terminals, the steering information indicating to the mobile terminals to preferably use the non-selected access network not being selected to be set to the power-save mode; and setting the selected access network to the power-save mode.

2. The method as claimed in claim 1, wherein the first access network is based on a first access technology and the second access network is based on a second access technology, the second access technology being different from the first access technology.

3. The method as claimed in claim 1, wherein the first access network and the second access network are based on one access technology, the first access network being operated by a first operator and the second access network being operated by a second operator.

4. The method as claimed in claim 1, wherein the power consumption assessment is based on a power consumption metric.

5. The method as claimed in claim 1, wherein the power consumption assessment comprises an evaluation of a demand of communication traffic in the access area and an evaluation of a capacity of communication traffic in the access area.

6. The method as claimed in claim 5, wherein the power consumption assessment comprises conducting an optimization procedure, wherein power consumption is optimized while using at least a part of the evaluated capacity and providing at least a part of the evaluated demand.

7. The method as claimed in claim 1, wherein the power consumption assessment comprises analyzing recorded power consumption data.

8. The method as claimed in claim 1, wherein the power consumption assessment comprises considering expectation values.

9. The method as claimed in claim 1, wherein the power consumption assessment comprises an assessment of whether setting the selected access network to the power-save mode will reduce the overall power consumed by said access networks, said multi-access system, or both, while still serving a selected number of mobile terminals in the access area or serving a selected number of mobile terminals in the access area with at least a minimum quality of service.

10. The method as claimed in claim 1, wherein the method comprises conducting the power consumption assessment.

11. The method as claimed in claim 1, wherein performing the steering operation comprises setting of preferences being stored in the mobile terminal.

12. The method as claimed in claim 1, wherein the steering operation comprises sending the steering information to mobile terminals that are in an active mode.

13. The method as claimed in claim 1, wherein the steering operation comprises sending the steering information to mobile terminals that are in a mode in which the mobile terminals control access selection.

14. The method as claimed in claim 13, wherein the steering operation comprises sending the steering information to mobile terminals that are in an idle mode.

15. A network entity managing an access network in a multi-access system, the access network serving mobile terminals in an access area, the network entity comprising:

a selecting circuit configured to select said access network to be set to a power-save mode on the basis of a power consumption assessment, wherein said power consumption assessment comprises an assessment of whether setting the selected access network to the power-save mode will reduce the overall power consumed by said access network, said multi-access system, or both, while still fulfilling defined demands, requirements, or both of communication traffic in the access area;

a steering circuit configured to generate steering information for the mobile terminals in said access area, the steering information indicating to the mobile terminals to preferably use another access network in said multi-access system;

a sending circuit configured to send said steering information to the mobile terminals in the access area; and a setting circuit configured to set said access network to the power-save mode if selected.

16. The network entity as claimed in claim 15, wherein the network entity further manages said other access network, said other access network serving mobile terminals in said access area, and wherein said selecting circuit is configured to select one of said access network and said other access network on the basis of the power consumption assessment.

17. The network entity as claimed in claim 15, wherein the power consumption assessment is based on a power consumption metric.

18. The network entity as claimed in claim 15, wherein the power consumption assessment comprises an evaluation of a demand of communication traffic in the access area and an evaluation of a capacity of communication traffic in the access area.

19. The network entity as claimed in claim 18, wherein the power consumption assessment comprises conducting an optimization procedure, wherein power consumption is optimized while using at least a part of the evaluated capacity and providing at least a part of the evaluated demand.

20. The network entity as claimed in claim 15, wherein the power consumption assessment comprises analyzing recorded power consumption data.

21. The network entity as claimed in claim 15, wherein the power consumption assessment comprises an assessment of whether setting the selected access network to a power-save mode will reduce the overall power consumed by said access network, said system, or both, while still serving a selected number of mobile terminals in the access area or serving a selected number of mobile terminals in the access area with at least a minimum quality of service.

22. The network entity as claimed in claim 15, wherein the selecting circuit is configured to select said access network to be set to the power-save mode when at least one of:

the number of mobile terminals in the access area falls below a first threshold; and the number of mobile terminals using services of the selected access network falls below a second threshold.

23. The method as claimed in claim 1, wherein said selecting comprises selecting to set said one of the first access network and the second access network to be set to the power-save mode when at least one of:

the number of mobile terminals in the access area falls below a first threshold; and the number of mobile terminals using services of the selected access network falls below a second threshold.

* * * * *

UNITED STATES PATENT AND TRADEMARK OFFICE
CERTIFICATE OF CORRECTION

PATENT NO.        : 8,885,613 B2                                       Page 1 of 1
APPLICATION NO.   : 12/937561
DATED             : November 11, 2014
INVENTOR(S)       : Sachs et al.

It is certified that error appears in the above-identified patent and that said Letters Patent is hereby corrected as shown below:

In the specification

Column 1, Line 25, delete "whish" and insert -- wish --, therefor.

Column 3, Line 47, delete "USE" and insert -- USB --, therefor.

Column 6, Line 38, delete "options" and insert -- options. --, therefor.

Column 16, Line 54, delete "senders.)) mode" and insert -- senders.) Mode --, therefor.

Column 18, Line 3, delete "modes) User" and insert -- modes). User --, therefor.

Signed and Sealed this
Twenty-third Day of February, 2016

Michelle K. Lee
*Director of the United States Patent and Trademark Office*